(12) United States Patent
Hayashi

(10) Patent No.: US 6,984,346 B2
(45) Date of Patent: Jan. 10, 2006

(54) COMPOSITE ELEMENT MANUFACTURING METHOD

(75) Inventor: Senichi Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 10/387,428

(22) Filed: Mar. 14, 2003

(65) Prior Publication Data

US 2003/0175415 A1    Sep. 18, 2003

(30) Foreign Application Priority Data

Mar. 18, 2002 (JP) ............................. 2002-074521
Mar. 3, 2003 (JP) ............................. 2003-055595

(51) Int. Cl.
*B29D 11/00* (2006.01)

(52) U.S. Cl. ....................... 264/1.32; 264/1.38; 264/1.7

(58) Field of Classification Search ............... 264/1.36, 264/1.7, 1.38, 1.32, 496; 425/808
See application file for complete search history.

(56) References Cited

U.S. PATENT DOCUMENTS 4,273,809 A * 6/1981 LaLiberte et al. .......... 427/155

FOREIGN PATENT DOCUMENTS

JP          4-34401          2/1992

\* cited by examiner

*Primary Examiner*—Mathieu D. Vargot
(74) *Attorney, Agent, or Firm*—Fitzpatrick, Cella, Harper & Scinto

(57) ABSTRACT

The object of this invention is to decrease a stress to accumulate in a resin layer while preventing any uncured portion from forming in a side surface of the resin layer. In order to achieve this object, this invention provides a composite element manufacturing method of forming, on a surface of a base material, a resin layer to which the shape of a molding surface of a mold is transferred, thus manufacturing a composite element in which the base material and the resin layer are integrated. The resin layer is released from the mold when the resin layer is in a cured state where a viscosity Log $\eta$ of a resin that forms the resin layer is 10 to 15 [dPa·s].

2 Claims, 2 Drawing Sheets

ENERGY IRRADIATION TIME

COMPOSITE ELEMENT MANUFACTURING METHOD

FIELD OF THE INVENTION

The present invention relates to a technique for manufacturing a composite element such as an optical element (e.g., diffraction optical element) by forming a resin layer on a base material.

BACKGROUND OF THE INVENTION

Conventionally, as a technique for manufacturing a composite element by forming a resin layer on a substrate, a manufacturing method disclosed in, e.g., Japanese Patent Laid-Open No. 4-34401, is known. According to the technique described in this reference, in the process of light energy irradiation, when light energy irradiation is started, air in the vicinity of the outer surface of a resin layer is substituted for by a nonoxidizing gas atmosphere simultaneously, so that the outer surface of the resin layer does not form any uncured portion.

The above manufacturing method has the following problems.

Generally, when a resin layer is cured by irradiating it with light energy, it shrinks on curing. The shrinkage amount of the resin is large particularly immediately after the start of curing. Hence, the resin preferably flows freely to a certain degree so that the stress is not likely to accumulate in the resin layer. With the technique described in the above reference, however, when light energy irradiation is started, air that is in contact with the outer surface of the resin layer is substituted for by the nonoxidizing gas atmosphere simultaneously, to promote curing. As the resin shrinks, stress undesirably accumulates in the resin layer. The accumulated stress can deform or break the fine-shaped diffraction grating portion when the resin layer is released from the mold.

SUMMARY OF THE INVENTION

The present invention has been made in view of the problem described above, and has as its object to decrease the stress to accumulate in the resin layer while preventing any uncured portion from forming in the side surface of the resin layer.

In order to solve the above problem and achieve the above object, a composite element manufacturing method according to the present invention is a composite element manufacturing method of forming, on a surface of a base material, a resin layer to which a shape of a molding surface of a mold is transferred, thus manufacturing a composite element in which the base material and the resin layer are integrated, characterized in that the resin layer is released from the mold when the resin layer is in a cured state where a viscosity Log $\eta$ of a resin that forms the resin layer is 10 to 15 [dPa·s].

The composite element manufacturing method according to the present invention is also characterized in that the resin is a light-energy-curing resin.

The composite element manufacturing method according to the present invention is also characterized in that after being removed from the mold, the resin layer is further cured by light energy irradiation in a nonoxidizing atmosphere.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

An embodiment of the present invention will be described.

An outline of this embodiment will be described first.

A composite element manufacturing method according to the embodiment of the present invention has the steps of (1) dropping a light-energy-curing resin onto a mold, (2) slowly bringing a transparent substrate into contact with the resin and controlling it to have a desired resin thickness, (3) irradiating the rear surface of the transparent substrate with a light energy, to cure the resin, (4) thereafter releasing the light-energy-curing resin from a mold when the resin is in a cured state corresponding to a resin viscosity Log $\eta$ of 10 to 15 [dPa·s], and (5) further curing the resin by light energy irradiation in a nonoxidizing atmosphere.

Figure 1:
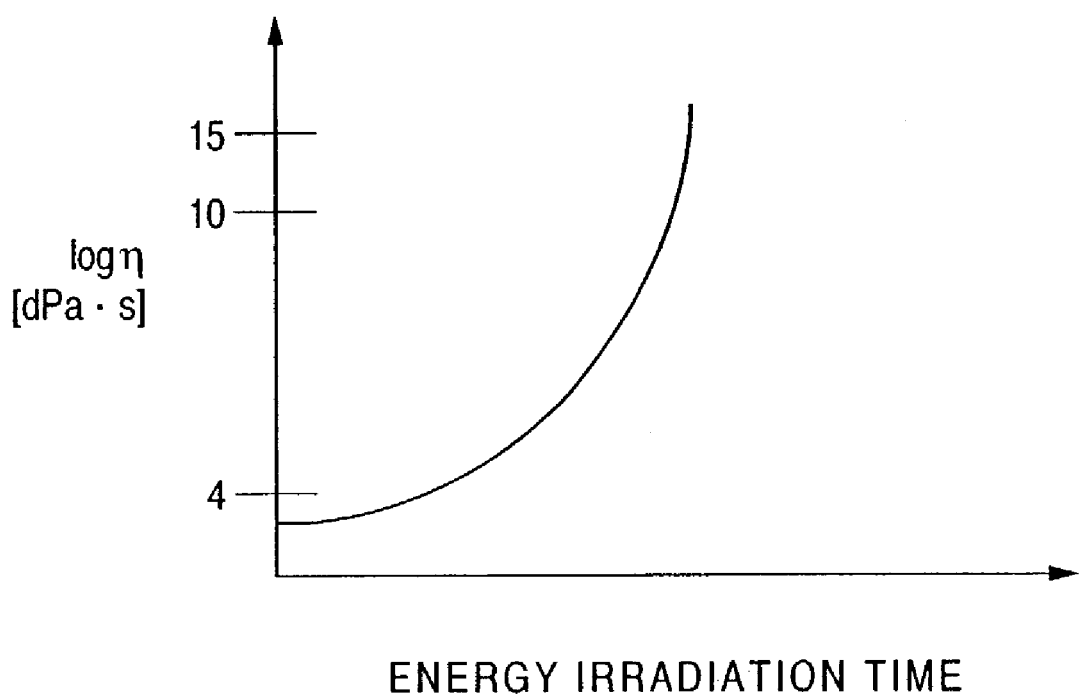
FIG. 1 is a graph for explaining the principle of a composite element manufacturing method according to an embodiment of the present invention.

A relationship as shown in FIG. 1 is present between the energy irradiation time and the resin viscosity Log $\eta$. A viscosity coefficient $\eta$ was measured with a commercially available viscosity measurement unit which is modified to have a light irradiation window so that it can measure the viscosity of a light-curing resin after each light irradiation time.

The resin viscosity started to increase exponentially immediately after light energy irradiation was started. When the viscosity Log $\eta$ was 10 or more, the stress was moderated considerably and mold release was possible. When the viscosity Log $\eta$ exceeded 15, it indicated a high viscosity. If a diffraction optical element having a sawtooth section was to be released from the mold, its fine shape or grating shape deformed, fractured or broke.

An embodiment of the present invention will now be described in detail. Note that the present invention is not limited to this embodiment.

In this embodiment, the present invention is applied to the manufacture of a diffraction optical element for a low-profile image sensing module.

FIGS. 2A to 2D are views showing the steps in manufacturing a diffraction optical element according to this embodiment.

Figure 2A:
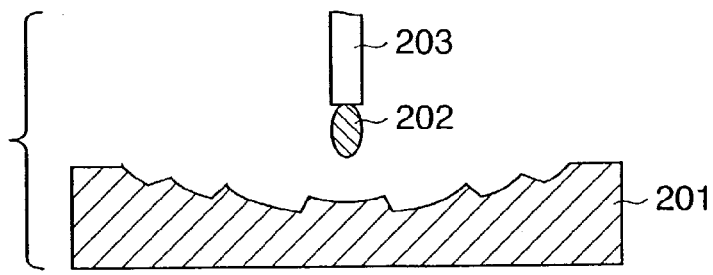
FIGS. 2A to 2D are sectional views showing the steps in manufacturing the composite element according to the embodiment.

First, as shown in FIG. 2A, a photo-curing resin 202 (ultraviolet-curing resin in this embodiment) was applied to a mold 201, having a high-precision ground and then Ni-plated surface, to a maximum film thickness of 100 $\mu$m by using a dispenser 203. The maximum film thickness is a length obtained when the resin film is vertically measured from the distal end of the largest grating to the surface of a glass substrate 204 in FIG. 2C. In other words, the maximum film thickness signifies the height from the surface of the glass substrate 204 to the distal end of the largest grating. As the photo-curing resin 202, GRANDIC RC C001 available from Dainippon Ink And Chemicals was used.

Figure 2B:
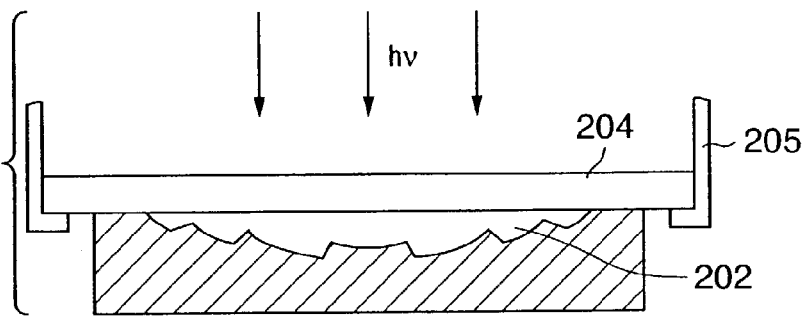

As shown in FIG. 2B, the glass substrate 204, which had been subjected to a silane coupling process for improving adhesion with the photo-curing resin 202, was slowly brought into contact with the photo-curing resin 202 from one side by controlling mold release pins 205. To bring into contact with the photo-curing resin 202 from one side means bringing the glass substrate 204 into contact with the photo-curing resin 202 from either side of the mold release pins 205 that are axi-symmetrical in FIG. 2B. To slowly bring into contact with the photo-curing resin 202 means gradually increasing the contact area of the glass substrate 204 and photo-curing resin 202 from one side so that the glass substrate 204 comes into tight contact with the photo-curing resin 202 with no bubble inclusion. More specifically, it is appropriate to set the speed for descending the mold release pins 205 to about 20 µm/sec. A load was uniformly applied to the entire glass substrate 204 by using a load cell (not shown), and position control is performed so that the maximum film thickness of the photo-curing resin 202 becomes 100 µm. The rear surface of the glass substrate 204 was irradiated with ultraviolet rays with an illuminance of 10 mW/cm by a UV irradiation unit for 200 sec, to cure the photo-curing resin 202 until its viscosity Log η became almost 14 [dPa·s].

Figure 2C:

Furthermore, as shown in FIG. 2C, while the photo-curing resin 202 was half-cured (a state wherein the viscosity Log η was almost 14 [dPa·s]), the mold release pins 205 were gradually lifted up from one side, and the photo-curing resin 202 was released from the mold. Whether the distal end of the grating did not deform or fracture was checked.

Figure 2D:
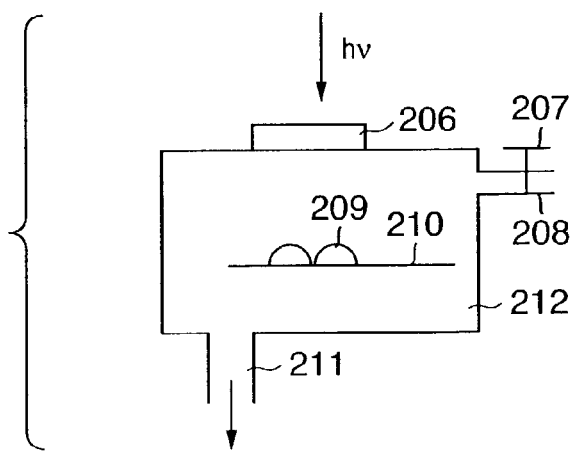

Furthermore, as shown in FIG. 2D, in a curing unit 212, a half-cured molded article 209 obtained by molding the photo-curing resin 202 was set at a predetermined position on a support base 210, and the interior of the curing unit 212 was evacuated to 1.3 Pa from an exhaust port 211 by a vacuum pump (not shown). The molded article denoted by 209 in FIG. 2D is the half-cured molded article shown in FIG. 2C but is reversed upside down. Although the molded article 209 actually forms a fine diffraction grating, it is simply indicated as an arcuate shape in FIG. 2D. Although several half-cured molded particles can be processed at once in the step shown in FIG. 2D, only two molded particles are shown in FIG. 2D. The UV irradiation unit emitted ultraviolet rays with an illuminance of 10 mW/cm for 1,000 sec through a glass window 206 to cure the molded article 209 completely. A valve 207 was opened to take in air through a gas inlet port 208, so that the interior of the curing unit 212 gradually leaked. When the interior of the curing unit 212 reached the atmospheric pressure, the molded article 209 was extracted, thus completing a diffraction optical element.

As the molded article 209 was completely cured in a nonoxidizing atmosphere (a vacuum), no uncured portion remaining on the side surface of the resin layer. Alternatively, in place of creating a vacuum atmosphere in the curing unit 212, air was evacuated once, and after that nitrogen gas was introduced from the gas inlet port 208, so the molded article 209 was completely cured in the same manner in a nonoxidizing atmosphere (nitrogen atmosphere). In this case as well, no uncured portion remained on the side surface of the resin layer.

In this manner, the viscosity of the photo-curing resin was adjusted by means of the curing condition, and the resin was released from the mold while it was in a half-cured state (a cured state in which the resin viscosity Log η was 10 to 15 [dPa·s]) so that the stress in the resin decreased. Thus, the fine shape or grating shape can be prevented from deforming or breaking. Also, since complete curing was performed in a non-oxidizing atmosphere, the composite element was manufactured without leaving any uncured portion in the side surface of the resin layer.

As has been described above, according to the above embodiment, the stress which accumulates in the resin layer is decreased, so that the fine shape or grating shape can be prevented from deforming, fracturing or breaking, and no uncured component may form in the side surface of the resin layer.

As has been described above, according to the above embodiment, the stress which accumulates in the resin layer can be decreased while preventing any uncured portion from forming in the side surface of the resin layer.

The present invention is not limited to the above embodiments and various changes and modifications can be made within the spirit and scope of the present invention. Therefore, to apprise the public of the scope of the present invention the following claims are made.

What is claimed is:

1. A composite element manufacturing method of forming, on a surface of a base material, a resin layer to which a shape of a molding surface of a mold is transferred, thus manufacturing a composite element in which the base material and the resin layer are integrated, wherein
   the composite element is a diffraction grating optical element,
   the resin is a light-energy-curing resin, and
   the base material and the resin layer are released from the mold when the resin layer is in a cured state caused by light energy irradiation where a viscosity Log η of a resin that forms the resin layer is 10 to 15 [dPa·s], and
   wherein after being released from the mold, the resin layer is further cured by light energy irradiation.

2. The method according to claim 1, wherein after being removed from the mold, the resin layer is further cured by light energy irradiation in a nonoxidizing atmosphere.

* * * * *